United States Patent

Kuhn, Jr.

[11] Patent Number: 5,782,484
[45] Date of Patent: Jul. 21, 1998

[54] SHORT LONG ARM INDEPENDENT SUSPENSION

[75] Inventor: Robert M. Kuhn, Jr., Temperance, Mich.

[73] Assignee: Chrysler Corporation, Auburn Hills, Mich.

[21] Appl. No.: 645,974

[22] Filed: May 14, 1996

[51] Int. Cl.$^6$ .................. B60G 3/20; B60G 11/14; B60G 15/06
[52] U.S. Cl. .................. 280/663; 280/666; 280/673; 280/691; 280/696; 280/726; 267/248
[58] Field of Search .................. 280/666, 668, 280/663, 660, 670, 696, 691, 690, 701, 692, 697, 726, 725, 673, 675; 267/248, 256, 228

[56] References Cited

U.S. PATENT DOCUMENTS

| | | |
|---|---|---|
| 4,377,298 | 3/1983 | Finn et al. . |
| 4,657,271 | 4/1987 | Salmon . |
| 4,863,188 | 9/1989 | Killian . |
| 4,871,187 | 10/1989 | Schaible . |
| 4,874,185 | 10/1989 | Kijima et al. . |
| 4,878,688 | 11/1989 | Kubo . |
| 4,957,307 | 9/1990 | Gandiglio . |
| 4,966,385 | 10/1990 | Iwasaki et al. . |
| 5,114,175 | 5/1992 | Sakai . |
| 5,114,176 | 5/1992 | Sawai . |
| 5,156,646 | 10/1992 | Alesso et al. . |
| 5,257,801 | 11/1993 | Matsuzawa et al. . |
| 5,284,353 | 2/1994 | Shinji et al. . |
| 5,362,091 | 11/1994 | Lee . |
| 5,372,377 | 12/1994 | Lee . |
| 5,374,076 | 12/1994 | Lee . |
| 5,375,870 | 12/1994 | Smith et al. .......... 280/668 |
| 5,380,035 | 1/1995 | Lee . |
| 5,405,162 | 4/1995 | Chun . |
| 5,435,591 | 7/1995 | Lee . |
| 5,439,244 | 8/1995 | Tomosada et al. . |

FOREIGN PATENT DOCUMENTS

| | | | |
|---|---|---|---|
| 486337A1 | 5/1992 | European Pat. Off. ........ 280/690 |
| 2 285 256 | 5/1976 | France .................. 280/701 |
| 42 42 815 | 6/1993 | Germany ................ 280/673 |
| 41 07 856 | 9/1993 | Germany ................ 280/691 |
| 56-82613 | 7/1981 | Japan .................. 280/690 |
| 1 296 722 | 11/1972 | United Kingdom ........... 280/668 |
| 2 069 947 | 9/1981 | United Kingdom ........... 280/701 |

*Primary Examiner*—Peter C. English
*Attorney, Agent, or Firm*—Roland A. Fuller, III

[57] ABSTRACT

A vehicle wheel suspension for steerable drive wheels has a wheel carrier with a tie rod to steer a wheel. A strut assembly is present which is coupled with a mounting member. A lower arm, which has two legs, each leg having an end to be coupled with the chassis, includes one of the legs coupled to the mounting member. Another end of the lower arm is coupled with the wheel carrier. An upper arm, which has two legs, each leg having an end coupled with the mounting member, includes one of its ends coupled with the wheel carrier. The wheel suspension improves tire wear and handling of the vehicle.

10 Claims, 3 Drawing Sheets

SHORT LONG ARM INDEPENDENT SUSPENSION

FIELD OF THE INVENTION

The present invention relates to vehicle suspension systems and, more particularly, to steerable short long-arm suspensions.

Vehicle suspension systems for steerable drive wheels connect an axle shaft and a vehicle body to each other and absorb vibrations and impacts from a road surface while running to improve vehicle safety as well as riding comfort. A vehicle suspension system should be flexibly connected vertically to absorb impacts. Also, the vehicle suspension should be firmly horizontally connected to insure driving force, braking force, and centrifugal force during vehicle turning. These forces are generated at the wheel.

Independent suspension systems are mainly applied to axles of passenger cars or sport utility vehicles to improve the ride comfort and running safety by bisecting an axle and allowing both wheels to act independently of one another. There are many different types of independent suspension systems. McPherson type and Wishbone type suspension systems are applied to steerable wheels. A vehicle suspension system for a steerable wheel is designed to control position of a wheel with respect to the vehicle body to obtain a better positioning in vehicle operation, as well as to absorb vibrations or impacts. The axle is thus prevented from directly transmitting impact or vibration from the road surface to the vehicle body. Thus, optimal handling safety and running safety may be obtained. Therefore, it is desirable to have an independent suspension which provides these characteristics.

SUMMARY OF THE INVENTION

The present invention provides the art with a suspension system which may be utilized in McPherson type suspension systems. The present invention provides a shorter upper arm and a longer lower arm wherein the upper arm is secured with a strut assembly. The upper arm is allowed to slide, along with the strut, between the lower arm and an upper chassis mounting point of the strut assembly. The present invention reduces camber change in the spindle as well as enabling higher roll centers to reduce roll moment. The invention enables the differential to be raised for higher ground clearance while reducing dynamic or working half-shaft angles as well as the outer constant velocity joint angle. The strut assembly in the suspension system doubles as a damper. An interchangeable mounting structure is present to mount with a McPherson strut while providing a reduced package height. The present invention also enables the shorter suspension arms to achieve greater wheel travel.

The vehicle suspension system for a steerable drive wheel includes a wheel carrier generally including a tie rod to steer the wheel. The suspension system has a strut assembly as well as a mounting member which is coupled with the strut assembly. A lower arm, which includes two legs, each leg having an end to be coupled with a chassis, includes one of its legs coupled with the mounting member. Another of the ends of the lower arm is coupled with the wheel carrier. An upper arm, which has two legs, each leg including an end coupled with the mounting member, includes one of its ends coupled with the wheel carrier. The suspension system improves tire wear as well as reducing constant velocity joint plunge. The invention improves on and off wheel handling by maintaining wheel verticality to the road and also reduces tire travel envelope size.

Additional objects and advantages of the invention will become apparent from the detailed description of the accompanying drawings or may be learned by practice of the invention.

DETAILED DESCRIPTION OF THE PREFERRED EMBODIMENT

Figure 1:
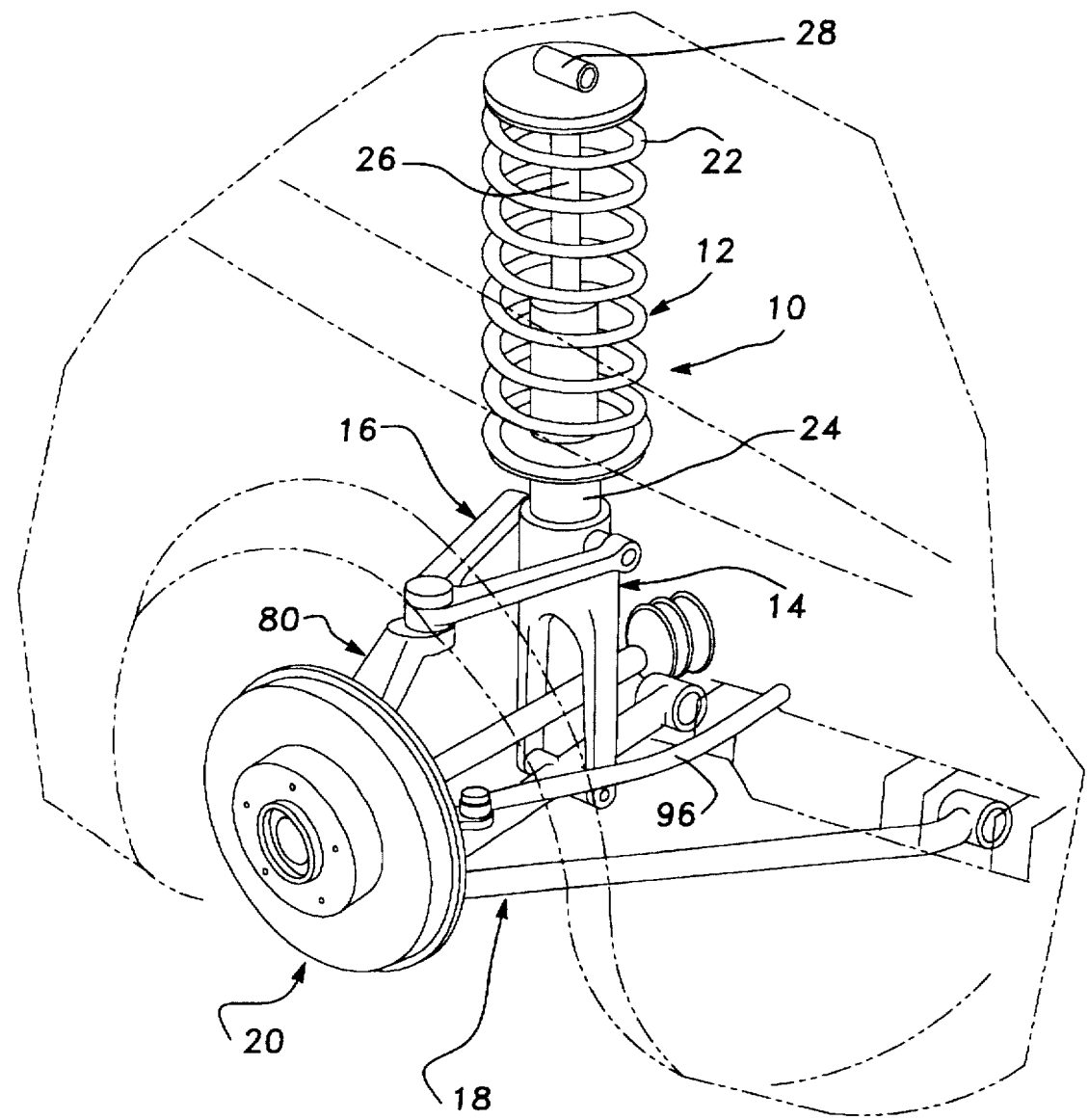
FIG. 1 is a perspective view of a suspension system in accordance with the present invention.

Turning to the figures, FIG. 1 illustrates a suspension system which is designated with the reference numeral 10. The suspension system 10 includes a suspension damper or strut 12, a mounting member 14, an upper arm assembly 16, a lower arm assembly 18, and a wheel carrier 20.

The strut 12, like a McPherson strut, includes a spring 22, cylinder 24 and piston rod 26. An upper pivot connection 28 at the free end of the piston rod 26, secures the strut 12 to the vehicle body chassis. A fastener 30 on the cylinder 24 secures the strut 12 to the mounting member 14. Thus, the fastener 30 enables ready removal of the strut assembly 12 from the mounting member 14 for easy replacement of the strut assembly 12.

Figure 2:
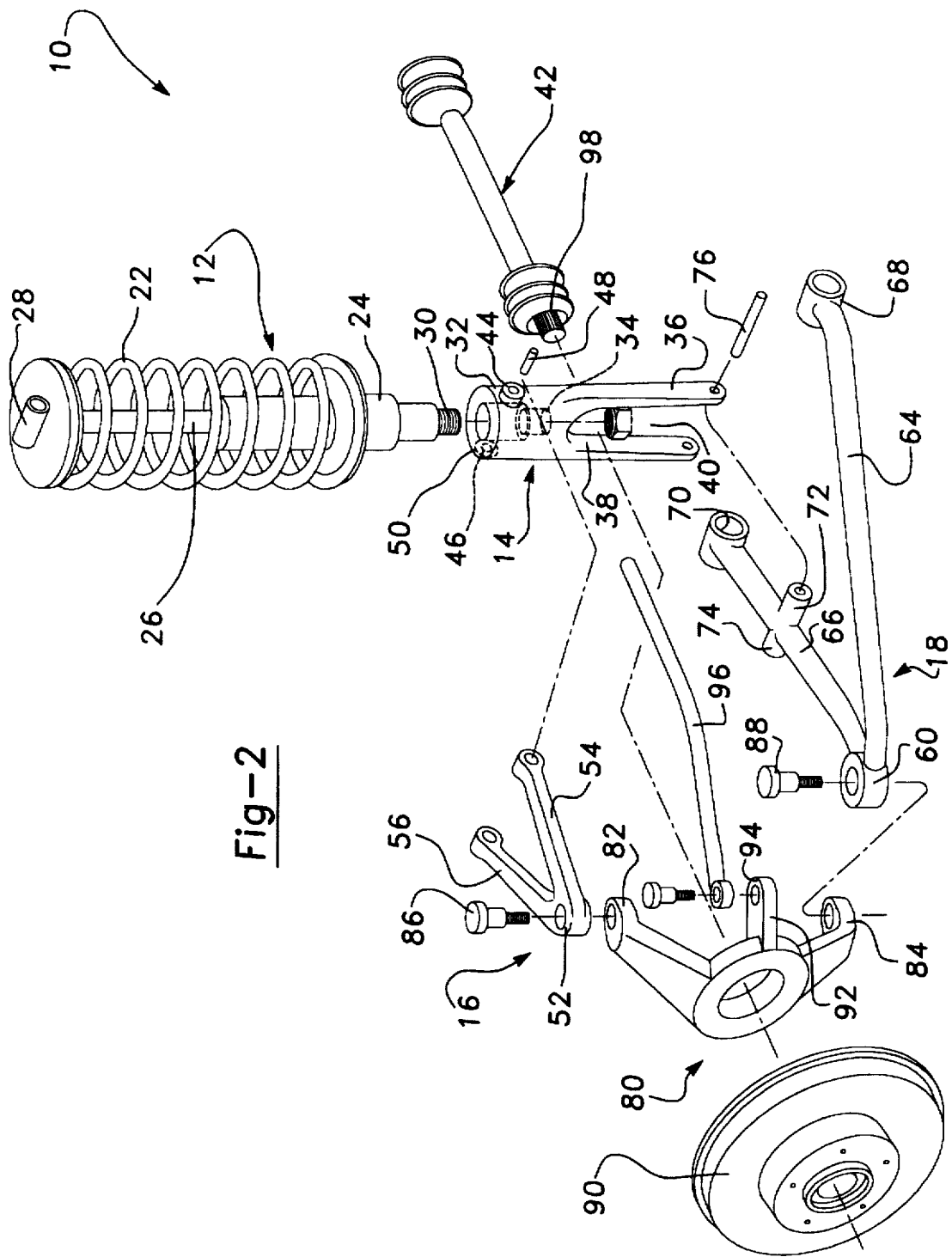
FIG. 2 is an exploded perspective view of the suspension system of FIG. 1.

The mounting member 14 includes a receiving portion 32 which receives the strut cylinder 12 as well as an aperture 34 which enables the fastener 30 to pass therethrough to fasten the strut assembly 12 to the mounting member 14. The mounting member 14 also includes a pair of legs 36 and 38 which are unitary with the receiving portion 32. The legs define a U-shaped space 40 which enables passage of the half-shaft 42 of the drivetrain. Thus, the half-shaft 42 passes directly to the wheel carrier 20 reducing the angle of the half-shaft with respect to the wheel carrier 20 as seen in FIG. 2. Also, the mounting member 14 includes a pair of trunnions 44 and 46 which may include pins 48 and 50 which secure the upper arm 16 to the mounting member 14.

Figure 3:
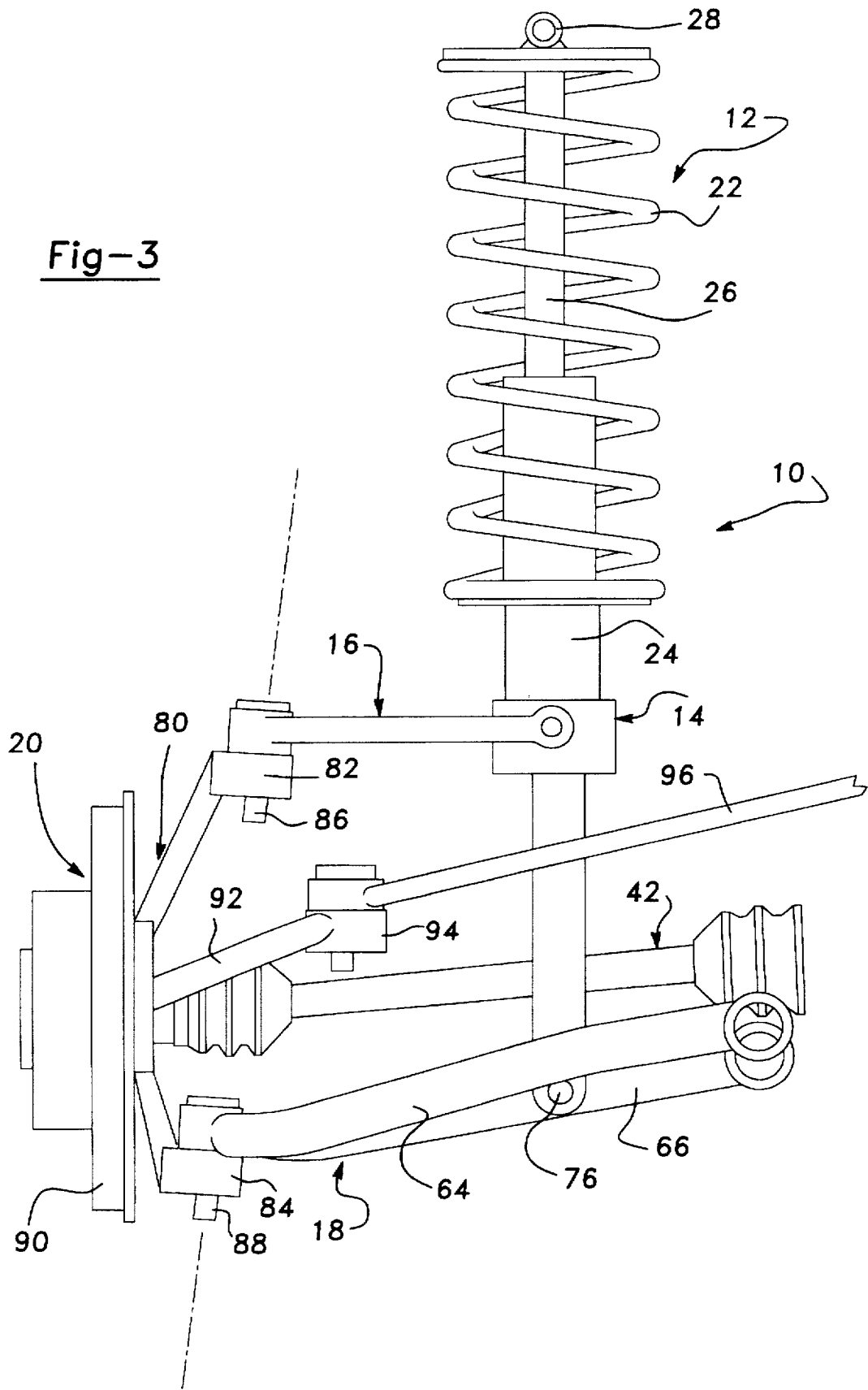
FIG. 3 is a plan view of the suspension system of FIG. 1.

The upper arm 16 has an overall V-shape with the vertex 52 including an aperture to enable a pivot such as a ball joint 86 to pass therethrough to secure the upper arm 16 to the wheel carrier 20. Each leg 54 and 56 extends from the vertex 52 and is secured at its respective mounting member trunnion 44 and 46. The legs 54 and 56 are substantially coplanar with respect to one another as seen in FIG. 3.

The lower arm assembly 18 is a unitary member having a vertex 60 with a pivot such as a ball joint 88 therein to secure the lower arm 18 to the wheel carrier 20. The lower arm 18 has an overall V-shape with its legs 64 and 66 out of plane with respect to one another as seen in FIG. 3. The ends 68 and 70 of the legs 64 and 66 enable the lower arm 18 to be secured with the vehicle body chassis. The leg 66 includes a pair of trunnions 72 and 74 which include pin 76 to secure the legs 36 and 38 of the mounting member 14 to the lower arm 18. The pin 76 passes through apertures in each of the legs of the mounting member 14. Thus, this enables the upper arm 16 to slide along with the strut 12 between the lower control arm and an upper chassis mounting point.

The wheel carrier 20 includes a knuckle 80 which includes pivots 82 and 84 which receive ball joints 86, 88 to secure the upper 16 and lower 18 arms to the knuckle 80. The ball joints 86 and 88 are collinear with one another and define the king pin axis. The knuckle 80 also includes the wheel hub 90 which is secured via a spindle 98, with the half shaft 42 to drive the wheel hub 90. Also, a steering arm 92 extends from the knuckle 80. The steering arm 92 includes a pivot 94 which a tie rod 96 is connected thereto to enable steering of the wheel carrier 20.

Thus, by providing a suspension system like that described in the present invention, the camber change is reduced in the spindle. Also, higher roll centers are present which in turn reduce roll moment. The present invention also enables the differential to be raised for better ground clearance while, in turn, reducing the dynamic or working half-shaft angles and the outer CV joint angle. The mounting member is interchangeable with McPherson struts; however, it provides a reduced height package. The upper and lower arms are also shorter; however, they achieve greater wheel travel.

While the above detailed description describes the preferred embodiment of the present invention, the invention is susceptible to modification, variation and alteration without deviating from the scope and fair meaning of the subjoined claims.

What is claimed is:

1. A vehicle suspension system for a steerable drive wheel comprising:

a wheel carrier having a tie rod for steering a wheel;

a strut assembly;

a mounting member coupled with said strut assembly;

a lower arm having two legs, each leg with two ends, each leg having one end to be coupled with a chassis, the other ends of the legs coupled together, only one of said legs coupled with said mounting member, and another end of said lower arm coupled with said wheel carrier;

an upper arm having two legs, each leg having an end coupled with said mounting member and another end of said upper arm coupled with said wheel carrier.

2. The vehicle suspension system according to claim 1, wherein said mounting member includes a receiving portion for receiving said strut assembly and a pair of legs for coupling with said lower arm with said mounting member legs providing a space enabling passage of a driveshaft to said wheel carrier.

3. The vehicle suspension system according to claim 1, wherein said upper arm is V-shaped with the V vertex coupled with said wheel carrier.

4. The vehicle suspension system according to claim 3, wherein said upper arm legs are coplanar.

5. The vehicle suspension system according to claim 3, wherein said vertex is pivotal with respect to said wheel carrier.

6. The vehicle suspension system according to claim 1, wherein said lower arm is V-shaped with the V vertex coupled with the wheel carrier.

7. The vehicle suspension system according to claim 4, wherein said vertex is pivotal with respect to said wheel carrier.

8. The vehicle suspension system according to claim 1, wherein said upper arm is slidable with said strut assembly.

9. The vehicle suspension system according to claim 1, wherein one end of said strut assembly is adapted for coupling with the vehicle chassis.

10. The vehicle suspension system according to claim 1, wherein said strut assembly is readily removable from said mounting member.

* * * * *